(12) United States Patent
DeLuca

(10) Patent No.: US 11,093,994 B2
(45) Date of Patent: *Aug. 17, 2021

(54) IN-STORE SHOPPER LOCATION-BASED GIFT IDEA DETERMINATION

(71) Applicant: International Business Machines Corporation, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/244,380

(22) Filed: Jan. 10, 2019

(65) Prior Publication Data

US 2019/0147520 A1 May 16, 2019

Related U.S. Application Data

(63) Continuation of application No. 14/921,771, filed on Oct. 23, 2015, now Pat. No. 10,210,560.

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0635* (2013.01)

(58) Field of Classification Search
CPC .................. G06Q 30/0631; G06Q 30/0635
(Continued)

(56) References Cited

U.S. PATENT DOCUMENTS 7,627,502 B2 12/2009 Cheng et al.
8,560,357 B2 10/2013 Sickenius
(Continued)

FOREIGN PATENT DOCUMENTS

WO 2011129865 A2 10/2011

OTHER PUBLICATIONS

IBM, List of IBM Patents or Patent Applications Treated as Related, Applicant Appendix, Jan. 10, 2019, pp. 1-2, the contents of which are incorporated herein by reference in their entirety.
(Continued)

*Primary Examiner* — Robert M Pond
(74) *Attorney, Agent, or Firm* — Kulsoom Hasan

(57) ABSTRACT

Triangulated movement and non-movement of a mobile device of a shopper are tracked among different locations within at least one retail environment to identify a shopper merchandise proximity history of the shopper within the at least one retail environment. The tracking uses a coordinated combination of mobile device global positioning system (GPS) information with detected triangulated proximity of the mobile device relative to a plurality of different retail environment low-energy communication devices. Responsive to identifying within the shopper merchandise proximity history an item of merchandise that meets at least one shopper merchandise threshold interest criterion, an electronic message that includes a gift recommendation of the item of merchandise is provided to at least one other user associated with and located remotely from the shopper.

11 Claims, 7 Drawing Sheets

(58) Field of Classification Search
USPC .................................................. 705/26, 27
See application file for complete search history.

(56) References Cited

U.S. PATENT DOCUMENTS

| | | | |
|---|---|---|---|
| 8,725,567 | B2 | 5/2014 | Huang et al. |
| 8,825,526 | B2 | 9/2014 | Peters et al. |
| 2003/0154135 | A1 | 8/2003 | Covington et al. |
| 2005/0147072 | A1 | 7/2005 | Mahendran et al. |
| 2009/0094260 | A1 | 4/2009 | Cheng et al. |
| 2009/0298514 | A1 | 12/2009 | Ullah |
| 2011/0029370 | A1 | 2/2011 | Roeding et al. |
| 2012/0030011 | A1 | 2/2012 | Rey et al. |
| 2012/0233015 | A1 | 9/2012 | Calman et al. |
| 2013/0191251 | A1 | 7/2013 | Martin et al. |
| 2013/0282438 | A1 | 10/2013 | Hunter et al. |
| 2013/0297422 | A1 | 11/2013 | Hunter et al. |
| 2014/0136318 | A1 | 5/2014 | Alberth, Jr. et al. |
| 2014/0161316 | A1 | 6/2014 | Golan et al. |
| 2014/0200956 | A1 | 7/2014 | Gerszberg |
| 2015/0178739 | A1 | 6/2015 | Ghosh et al. |
| 2015/0309159 | A1* | 10/2015 | Boerhout ........... G08B 21/0272 342/452 |
| 2016/0012453 | A1 | 1/2016 | Naqvi |
| 2017/0116660 | A1 | 4/2017 | DeLuca |

OTHER PUBLICATIONS

Author Unknown, Providing Personalized In-Store Navigation Based on Historical and Demographic Data, Technical Disclosure IPCOM000242318D, Jul. 6, 2015, pp. 1-4, IP.com, Inc., Published at: https://priorart.ip.com/IPCOM/000242318.

Author Unknown, Enabling Users to Collaborate on Gifting to Friends, Technical Disclosure IPCOM000236956D, May 23, 2014, pp. 1-3, IP.com, Inc., Published at: https://priorart.ip.com/IPCOM/00236956.

Author Unknown, CitiBike: Bike share data in New York, animated, flowingdata.com, Apr. 1, 2014, pp. 1-2, FlowingData, Published online at: http://flowingdata.com/2014/04/01/bike-share-data-in-new-york/.

Stephanie Clifford, et al., Attention, Shoppers: Store Is Tracking Your Cell, The New York Times, NYTimes.com, Jul. 14, 2013, pp. 1-4, The New York Times Company, Published online at: http://www.nytimes.com/2013/07/15/business/attention-shopper-stores-are-tracking-your-cell.html?pagewanted=all&_r=0.

Author Unknown, IBM Cloud: Catalog, IBM.com, Printed from website on May 11, 2015, pp. 1-2, IBM Corporation, Published online at: http://www.ibm.com/cloud-computing/us/en/catalog.html#IBM_Platform_Big-Data.

Author Unknown, re:log: Tracking the Movements of Conference Attendees via WiFi, infosthetics.corn, Jun. 18, 2013, pp. 1-2, Information Aesthetics, Published online at: http://infosthetics.com/archives/2013106/relog_tracking_the_movements_of_conference_attendees_via_wifi.html.

Barbara Thau, How Big Data Helps Stores Like Macy's and Kohl's Track You Like Never Before, Forbes, Jan. 24, 2014, pp. 1-6, Forbes, Inc., Published online at: http://www.forbes.com/sites/barbarathau/2014/01/24/why-the-smart-use-of-big-data-will-transform-the-retail-industry/.

Author Unknown, People counter, Wikipedia, the free encyclopedia, Oct. 20, 2015, pp. 1-5, Wikimedia Foundation, Inc., Published at: https://en.wikipedia.org/wiki/People_counter.

Richard Finnie, Time is money! The impact of customer "Dwell Time" on Retail Sales, LinkedIn.com Pulse, Aug. 7, 2014, pp. 1-2, LinkedIn Corporation, Published at: https://www.linkedin.com/pulse/20140807162720-258558574-time-is-money-the-impact-of-customer-dwell-time-on-retail-sales.

Matthew McClearn, Keeping Track, Canadian Grocer, Feb. 2015, pp. 1-6, Rogers Publishing Limited, Chicago, IL, USA.

Joseph Sebastian, UK brands ramp up Beacons use, Marketing Week (Online), Mar. 4, 2014, pp. 1-3, Centaur Media Plc. and licensors, London, UK.

United States Patent and Trademark Office, Office Action for U.S. Appl. No. 14/921,771, dated Mar. 22, 2018, pp. 1-35, Alexandria, VA, USA.

United States Patent and Trademark Office, Notice of Allowance for U.S. Appl. No. 14/921,771, dated Oct. 5, 2018, pp. 1-31, Alexandria, VA, USA.

BRAM(US) Van Damme. "13 Visitor Flow Analysis Using the Conference Wifi." Published May 30, 2013. Accessed Jun. 8, 2020. 3 pages. Published by bram.us. https://www.bram.us/2013/05/30/republica-13-visitor-flow-analysis-using-the-conference-wifi/.

* cited by examiner

IN-STORE SHOPPER LOCATION-BASED GIFT IDEA DETERMINATION

BACKGROUND

The present invention relates to automated creation of wish lists. More particularly, the present invention relates to in-store shopper location-based gift idea determination.

Social network users create and manage wish lists by manually adding items of interest to their respective wish lists. The users publish their respective wish lists within one or more social networking websites so the wish lists are accessible to friends and family of the social network users. The friends and family may then purchase items identified within the respective wish lists as potential gifts to give the respective social network users.

SUMMARY

A computer-implemented method includes tracking a mobile device of a shopper within at least one retail environment; forming, from the tracking of the mobile device of the shopper within the at least one retail environment, a shopper merchandise proximity history of the shopper comprising shopper proximity to items of merchandise, shopper dwell times near the items of merchandise, and merchandise visit counts; analyzing the shopper merchandise proximity history according to at least one shopper merchandise threshold interest criterion; and performing, responsive to identifying within the shopper merchandise proximity history an item of merchandise that meets the at least one shopper merchandise threshold interest criterion, an action that facilitates a gift recommendation of the item of merchandise.

A system that performs the computer-implemented method and a computer program product that causes a computer to perform the computer-implemented method are also described.

DETAILED DESCRIPTION

Figure 1:
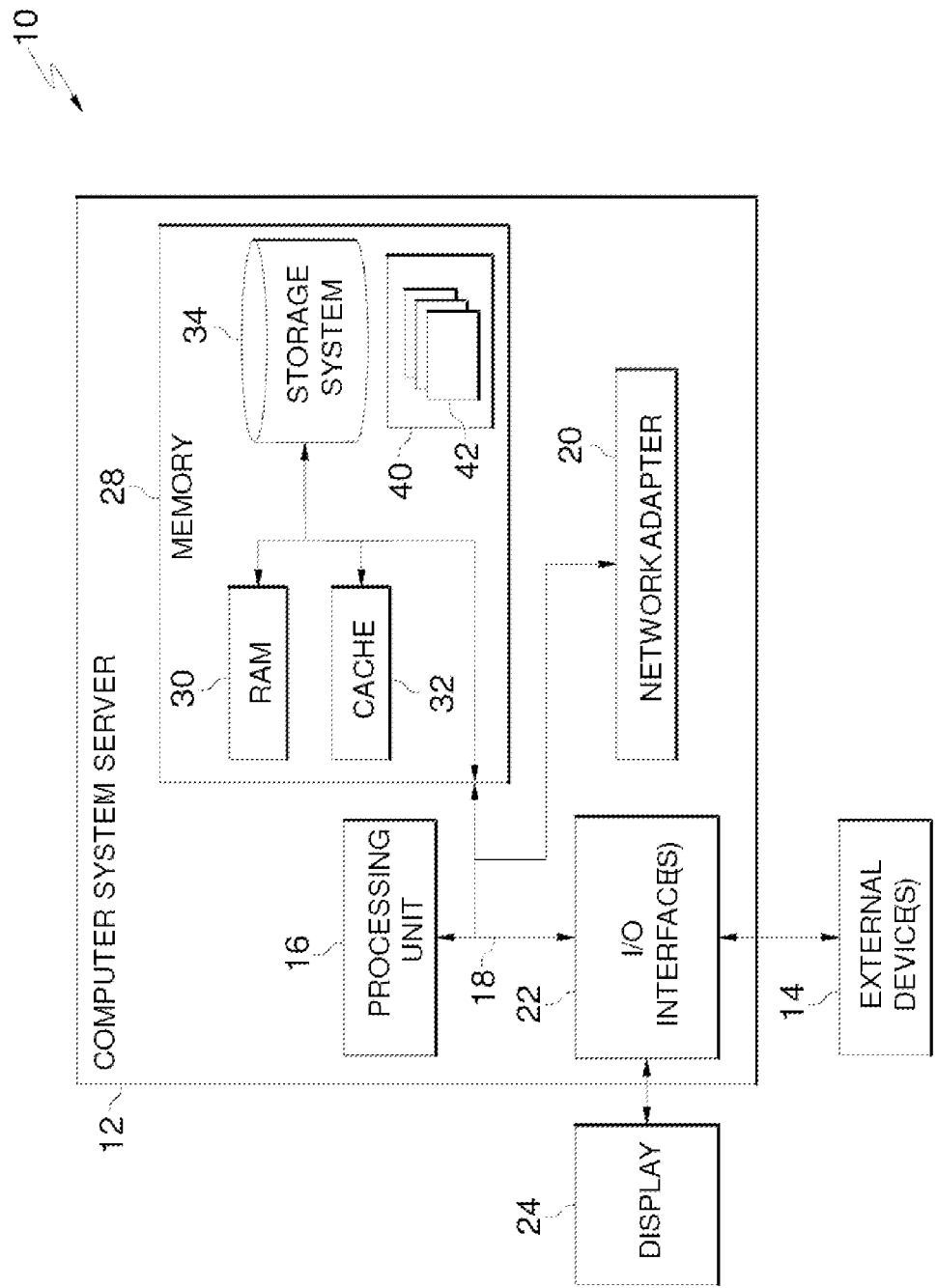
FIG. 1 depicts a cloud computing node according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides in-store shopper location-based gift idea determination. The present technology solves a recognized gift giving and gift identification problem by providing technology that includes a new form of wish list creation based upon monitoring of shopping patterns. The technology tracks each of shopper movement and shopper dwelling patterns (e.g., where a shopper remains in a particular location for a duration of time) as a shopper travels along a shopping trip within one or more retail environments. From this information, the technology may then infer shopper interests and may identify particular items that are of interest to the shopper over time and across a variety of retail environments. For example, a shopper may not consciously realize they have looked at a particular category/item (e.g., shoes) three times during the same shopping trip, but this type of pattern may be detected over time where a shopper routinely stops and spends time looking at certain items/categories of items. As such, the present technology may infer interests in gift items that shoppers would not otherwise manually add to a wish list or individualized gift guide.

The technology described herein operates by tracking a mobile device of a shopper within at least one retail environment. A shopper merchandise proximity history of the shopper is formed based upon the tracking of the mobile device of the shopper within at least one retail environment. The shopper merchandise proximity history includes shopper proximity to items of merchandise, shopper dwell times near the items of merchandise, and merchandise visit counts. The shopper merchandise proximity history is analyzed according to at least one shopper merchandise threshold interest criterion. Responsive to identifying within the shopper merchandise proximity history an item of merchandise that meets at least one shopper merchandise threshold interest criterion, an action is performed that facilitates a gift recommendation of the item of merchandise.

The present technology analyzes a shopper's movement within one or more brick and mortar retail environments/stores to determine how long the shopper stands (e.g., dwells/remains/stays) in certain areas of the store and the shopper's movement patterns within the stores. This shopper dwell and movement information may be used to determine a likelihood or probability that a particular item or category of items may be a good match for the user for a wish list or gift.

A shopper at a store may be equipped with user tracking capabilities, or movement of the shopper may be detected using other forms of technology, such as global positioning system (GPS) technology associated with the shopper's mobile device, or other form of location detection technology (e.g., Bluetooth low energy (BLE) or other hotspot beacons, triangulation, proximity, etc.). As the shopper moves through the store, their movement and non-movement (e.g., dwell time) may be tracked and utilized as described herein to infer suitable gifts for the shopper.

A number of preferences regarding when to "remember" an item or category of items for gifting may be established and configured. For example, a threshold dwell time may be established, such as an amount of time that a shopper spends in front of a display (e.g., one (1) minute, five (5) minutes, etc.). If the shopper dwells in front of a display for a time greater than the configured threshold dwell time, the item and/or category of items associated with the display may be added as a gift-giving suggestion.

Additionally, a threshold dwell time percentage may be established, such as a percentage of time that a shopper is in a store that is spent at particular display (e.g., ten percent (10%), twenty-five percent (25%), fifty percent (50%), etc.). If, while vising the store for one (1) hour, the shopper spends more than the configured threshold dwell time percentage of their shopping time in one location, the item and/or category of items associated with the location may be added as a gift-giving suggestion.

Additionally, a threshold number of shopper returns to items of merchandise may be established, such as a number of times a shopper returns to a particular display during one or more shopping trips (e.g., two (2) times, three (3) times, etc.). If the shopper returns to the particular display more than the configured threshold number of shopper returns, the item and/or category of items associated with the display may be added as a gift-giving suggestion.

Further, a threshold number of paired-shopper returns to items of merchandise may be established, such as a number of times a shopper returns to a particular display with another shopper (e.g., friend, family member, etc.), such as two (2) times, three (3) times, or other configurable number. The threshold number of paired-shopper returns may be established for a single shopping trip or across multiple shopping trips over time. The paired-shopper returns may further be configured to discern returns to the same display with the same paired shopper (e.g., spouse) or with any paired shopper (e.g., multiple different friends over time). If the shopper returns to the particular display more than the configured threshold number of paired-shopper returns, the item and/or category of items associated with the display may be added as a gift-giving suggestion.

As another alternative, a combined impression threshold may be established. For example, a combined impression threshold may include two (2) or more combined shopping information accesses, such as for example, a shopper's physical presence within a store combined with a virtual product lookup (e.g., looking at a television and also searching online for the same item or category), or the shopper's physical presence combined with scanning a barcode of an in-store item. If the shopper satisfies the combined impression threshold, the item and/or category of items associated with the combined impression may be added as a gift-giving suggestion.

Further, a multi-shopping trip number of shopper returns threshold may also be established, such as a number of times a shopper returns to a particular display over a period of time, such as two (2) times, three (3) times, or other configurable number over two (2), three (3), or other number of configurable weeks. If the shopper satisfies the multi-shopping trip number of shopper returns threshold, the item and/or category of items associated with the display may be added as a gift-giving suggestion.

Once any of the configured thresholds is met, one or more items associated with the respective display(s) and/or location(s) may be added to a shopper's wish list or gift guide. Alternatively, the item(s) may be suggested to one or more "friends" or family members as a potential gift item for the shopper (e.g., a push notification may be sent to the shopper's spouse to let the spouse know that the shopper has been looking at the particular item display and therefore the item may be a good gift idea for the shopper).

As part of the push notification, the other system users (e.g., friends or family members) may be provided with an opportunity to "view deals" related to the items identified to be of interest to the shopper. In response to any respective user opting to view deals associated with the identified items of interest, the user may be presented with and obtain/retrieve coupons or other discount opportunities related to the item(s) that have been identified to be of interest to the shopper. The coupons and discount opportunities may be queued in relation to events in the shopper's life (e.g., birthday, graduation, anniversary, etc.) to identify opportunities to acquire the identified items at discounts and at times that are particularly related to the events. As such, an incentive may be provided to another user to purchase the item of merchandise as a gift to the shopper.

Other types of information may be utilized to identify gift ideas. For example, merchandise-related communications may be utilized to identify gift ideas. Further, a shopper's purchase history may be utilized in conjunction with in-store dwell times to identify gift ideas for a shopper (e.g., the shopper recently purchased clothing, and is determined to be staying for extended times within an accessories department of a store).

As such, the present technology may identify items of interest to shoppers that may not otherwise be communicated to friends and family. The technology may additionally provide notifications that improve efficiency and time management for other users that are interested in giving one or more identified items as a gift to the shopper.

As an additional alternative, the item(s) identified to be of interest to the shopper may be shown to the shopper. By providing the identified items to the shopper, the shopper may be made aware of how often the shopper has expressed a non-verbal interest in the item(s).

Additional information may also be provided to the shopper or friends/family. For example, price comparisons across a number of stores, coupons, upcoming deals, and alternative product suggestions and recommendations or other information may be provided.

If any identified item of interest to a shopper is purchased at any point thereafter, either by another user or by the shopper, the other users with whom the gift idea information has been shared may be alerted so the other users may be directed to a different item as a gift for the shopper. Additionally, the wish list or gift guide may automatically remove the purchased item from the list to keep the wish list or gift guide accurate in real time. As such, the technology described herein may not only reveal gift ideas that may not otherwise be shared, but may also reduce redundant gift purchasing by correlating items of interest with tracking of actual purchases and notifications of purchases to friends/family of the respective shoppers.

It should be noted that conception of the present subject matter resulted from recognition of certain limitations associated with gift giving and gift identification. For example, it was observed that asking an intended gift recipient for a gift idea often "gives away" the gift because the recipient thereby knows exactly what they are going to be given, which takes away the surprise of the gift. Further, it was determined that there are certain categories of gift recipients that just seem to have everything, and thereby are difficult to buy gifts for that may be reasonable in price (e.g., they want a new car, but that may be just too much for a job anniversary gift). It was further determined that co-workers may want to give gifts to one another, but may not know the intended recipients well enough to know their particular likes. It was further determined that persons that are busy may not create wish lists that would otherwise make it easier for gift givers. The present subject matter improves gift giving by providing for automated in-store shopper location-based gift idea determination, as described above and in more detail below. As such, improved gift giving experiences may be obtained through use of the present technology.

The in-store shopper location-based gift idea determination described herein may be performed in real time to allow prompt identification of items of interest to shoppers and intended gift recipients. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additionally, the present technology may be implemented within or as part of a cloud computing environment (e.g., for data analytics), or may be implemented as a customized retail-environment specific solution. As such, examples of implementations for both environments are included herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
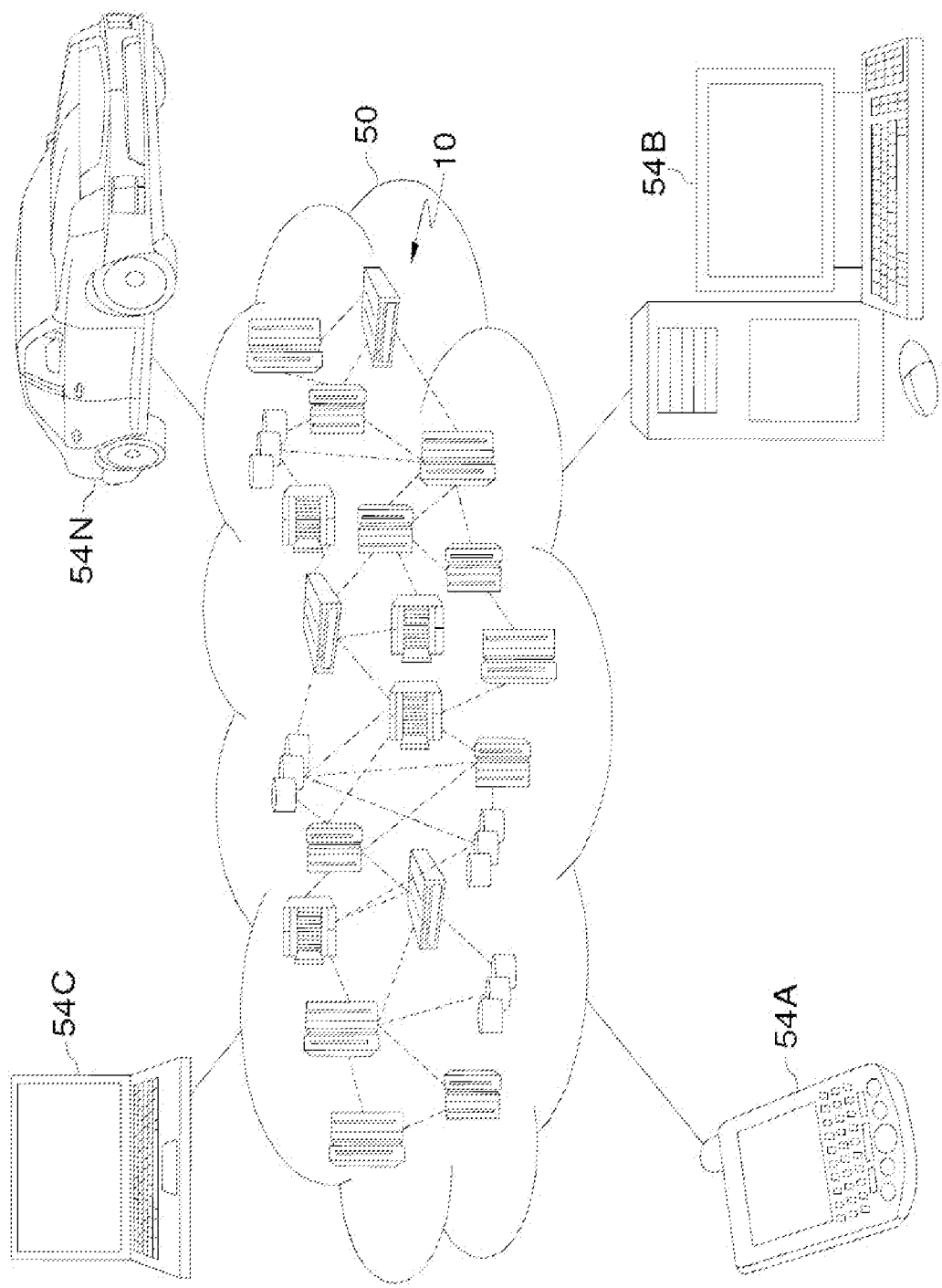
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
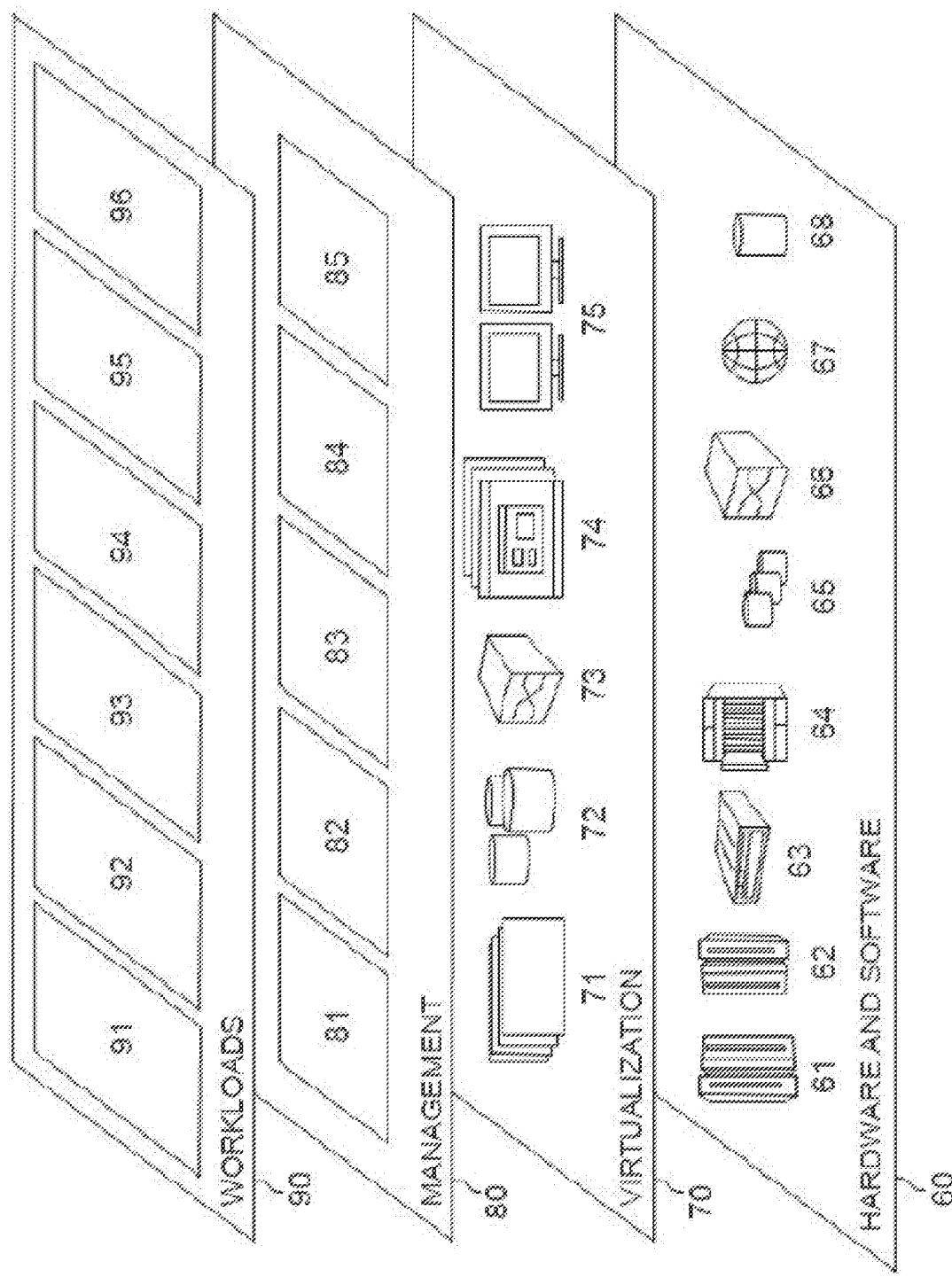
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-store shopper location-based gift idea determination 96.

Regarding alternative implementation options, FIGS. 4 and 5 below are directed to such alternatives. It should be understood that the various alternatives may be combined with or substituted with the implementation options described above, as appropriate for the given implementation.

Figure 4:
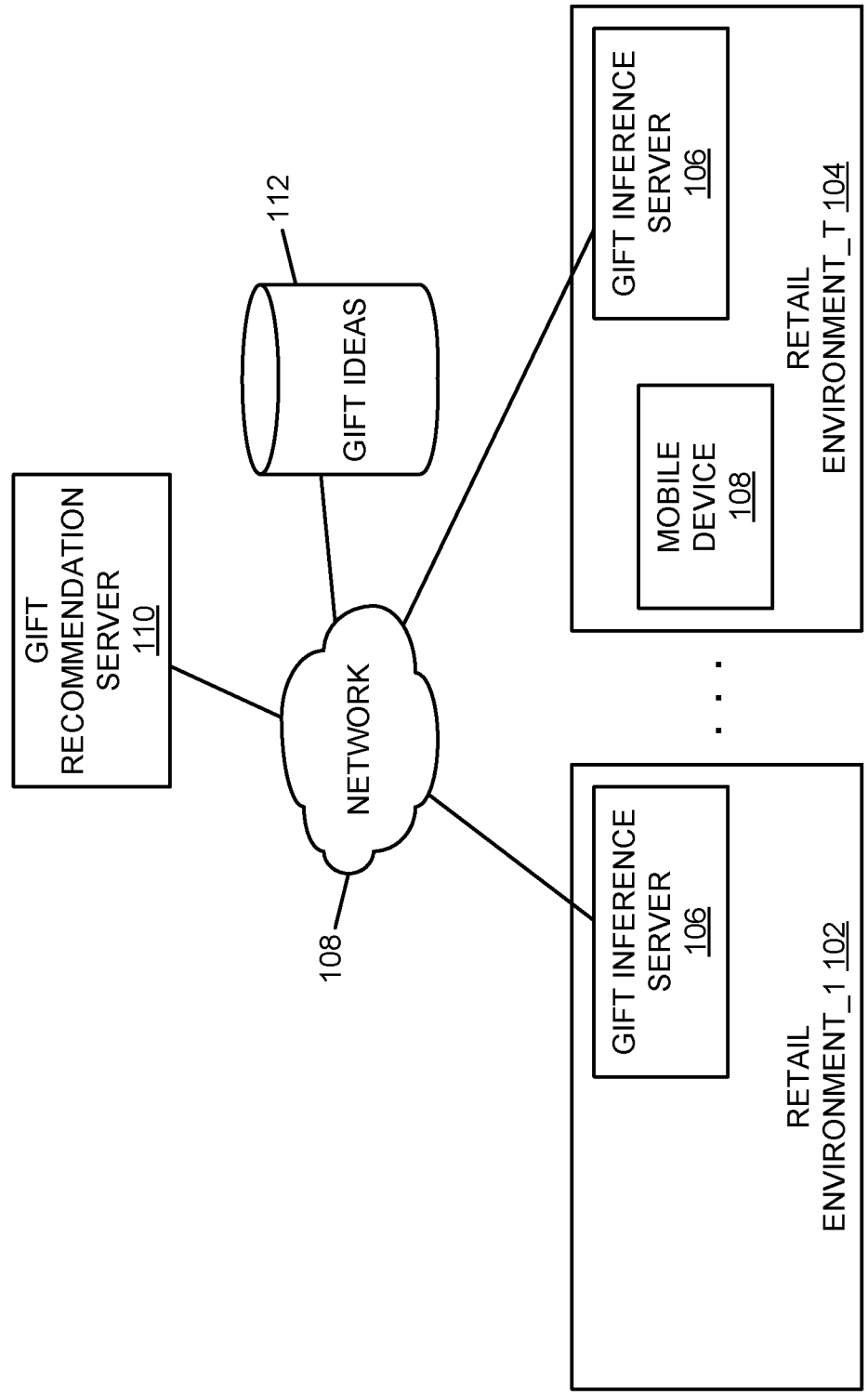
FIG. 4 is a block diagram of an example of an implementation of a system for in-store shopper location-based gift idea determination according to an embodiment of the present subject matter.

FIG. 4 is a block diagram of an example of an implementation of a system 100 for in-store shopper location-based gift idea determination. The system 100 may be implemented within a retail environment 102 through a retail environment_T 104. Alternatively, the system 100 may be implemented within a single retail environment, as appropriate for a given implementation.

A gift inference server 106 may be associated with each retail environment within which the system 100 is to be integrated. The gift inference servers 106 monitor shopper activities within the retail environments 102 through 104 by tracking mobile devices, such as the mobile device 108. The gift inference servers 106 derive/infer items of interest to shoppers according to tracked shopper movement and shopper dwelling patterns within the respective retail environment(s).

Each gift inference server 106 may communicate via a network 108 with a gift recommendation server 110. The gift recommendation server 110 may correlate information derived by the gift inference servers 106 within the retail environments 102 through 104, and may create wish list entries and gift guides for multiple different shoppers. Alternatively, the gift recommendation server 110 may be combined with a gift inference server 106, as appropriate for a given implementation.

A gift ideas database 112 is also illustrated. The gift ideas database 112 may store wish lists, gift guides, and other formats for gift ideas as appropriate for a given implementation.

As will be described in more detail below in association with FIG. 2 through FIG. 7, the gift inference server(s) 106 and the gift recommendation server 110 may each provide, either in coordination or autonomously, automated in-store shopper location-based gift idea determination. The automated in-store shopper location-based gift idea determination is based upon programmatic inference of shopper interests according to tracked shopper movement and shopper dwelling patterns within one or more retail environment(s). As such, the present technology may be implemented at a local and/or remote server device, or by a combination of such devices as appropriate for a given implementation. A variety of possibilities exist for implementation of the present subject matter, and all such possibilities are considered within the scope of the present subject matter.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The gift inference server(s) 106 and the gift recommendation server 110 may each include any device capable of providing gift recommendations in accordance with tracked shopper movements and dwell times (e.g., times of standing or remaining/staying in a particular area). As such, the gift inference server(s) 106 and the gift recommendation server 110 may each include a web server, application server, or other data server device.

The gift ideas database 112 may include a relational database, an object database, or any other storage type of device. As such, the gift ideas database 112 may be implemented as appropriate for a given implementation.

Figure 5:
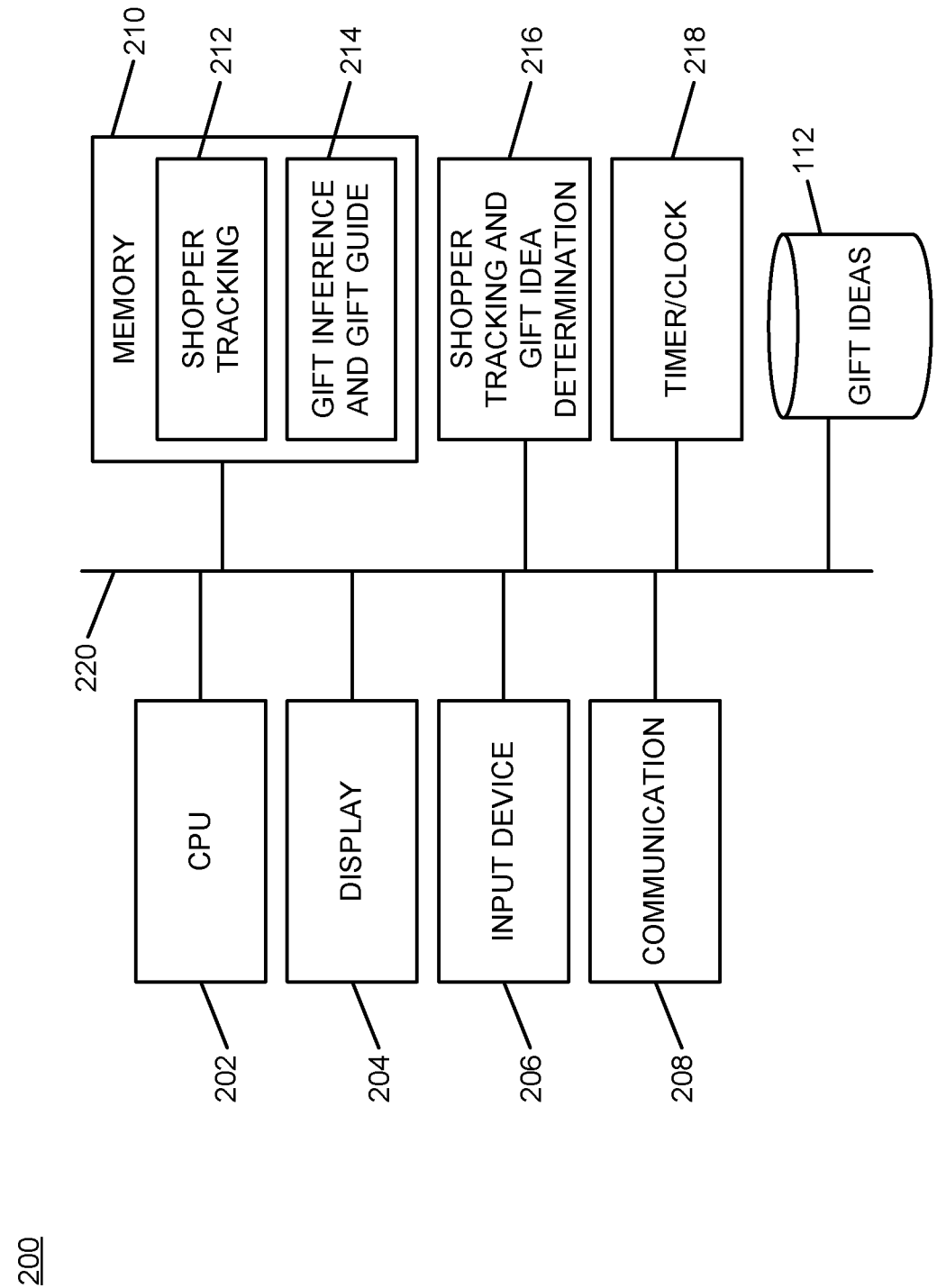
FIG. 5 is a block diagram of an example of an implementation of a core processing module capable of performing in-store shopper location-based gift idea determination according to an embodiment of the present subject matter.

FIG. 5 is a block diagram of an example of an implementation of a core processing module 200 capable of performing in-store shopper location-based gift idea determination. The core processing module 200 may be associated with each of the gift inference server(s) 106 and the gift recommendation server 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of gift idea information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a shopper tracking storage area 212 that stores shopper movement and dwelling pattern information within the core processing module 200. The memory 210 also includes a gift inference and gift guide area 214 that provides analytical processing space for gift identification processing in accordance with the tracked shopper movement and dwelling pattern information, and that provides storage for derived gift ideas within the core processing module 200.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A shopper tracking and gift idea determination module 216 is also illustrated. The shopper tracking and gift idea determination module 216 provides monitoring capabilities for detection and tracking of shopper movements and dwell patterns (e.g., GPS, BLE, triangulation, proximity, etc.), and provides gift identification and publishing capabilities for the core processing module 200, as described above and in more detail below. The shopper tracking and gift idea determination module 216 implements the automated in-store shopper location-based gift idea determination of the core processing module 200.

It should also be noted that the shopper tracking and gift idea determination module 216 may form a portion of other circuitry described without departure from the scope of the present subject matter. The shopper tracking and gift idea determination module 216 may form a portion of an interrupt service routine (ISR), a portion of an operating system, or a portion of an application without departure from the scope of the present subject matter. The shopper tracking and gift idea determination module 216 may also include an embedded device with circuitry designed specifically to perform the processing described herein as appropriate for a given implementation.

A timer/clock module 218 is illustrated and used to determine timing and date information, such as shopper movement and dwell times, as described above and in more detail below. As such, the shopper tracking and gift idea determination module 216 may utilize information derived from the timer/clock module 218 for information processing activities, such as the in-store shopper location-based gift idea determination described herein.

The gift ideas database 112 is again shown within FIG. 2 associated with the core processing module 200. As such, the gift ideas database 112 may be operatively coupled to the core processing module 200 without use of network connectivity, as appropriate for a given implementation.

The CPU 202, the display 204, the input device 206, the communication module 208, the memory 210, the shopper tracking and gift idea determination module 216, the timer/clock module 218, and the gift ideas database 112 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the gift ideas database 112 is illustrated as a separate component for purposes of example, the information stored within the gift ideas database 112 may also/alternatively be stored within the memory 210 without departure from the scope of the present subject matter. Accordingly, the core processing module 200 may take many forms and may be associated with many platforms.

Figure 6:
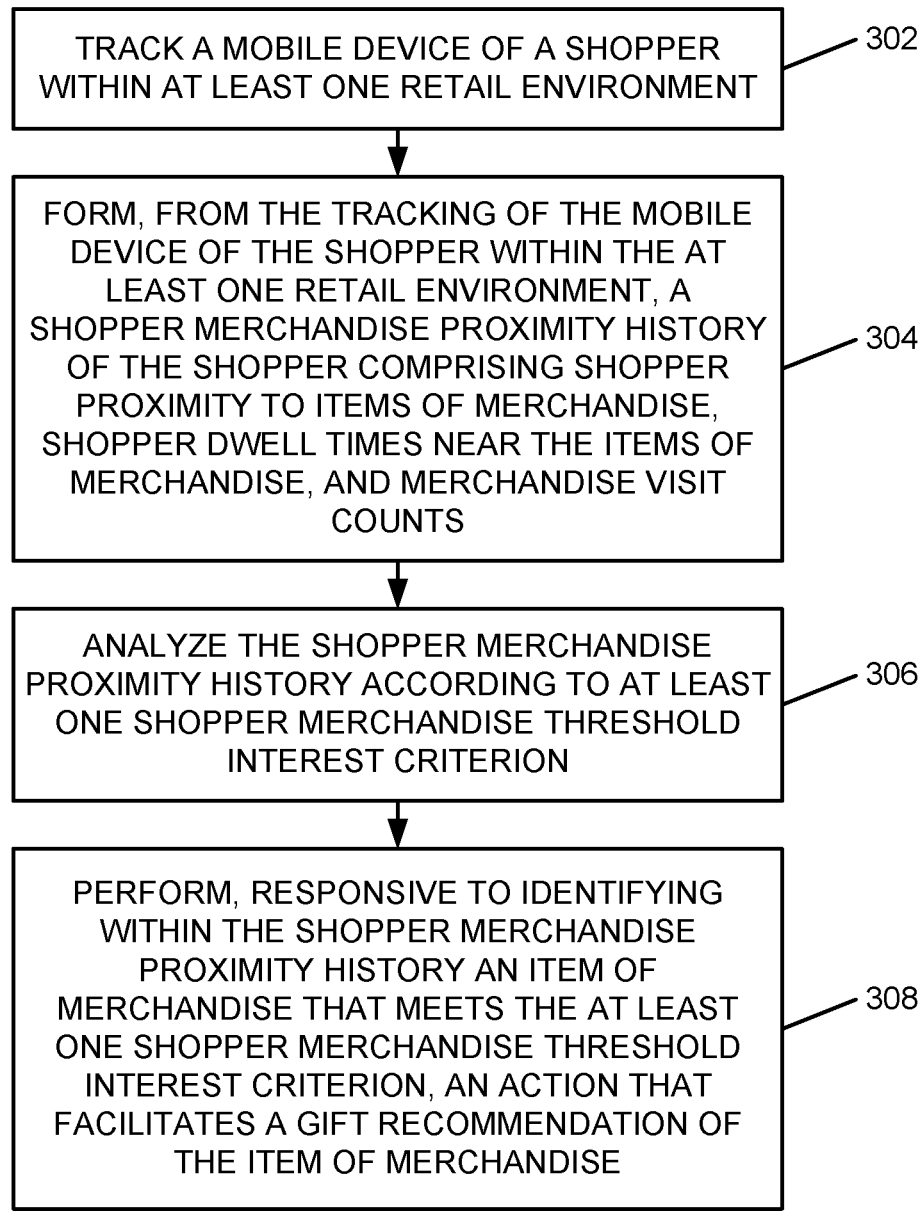
FIG. 6 is a flow chart of an example of an implementation of a process for in-store shopper location-based gift idea determination according to an embodiment of the present subject matter.
Figure 7:
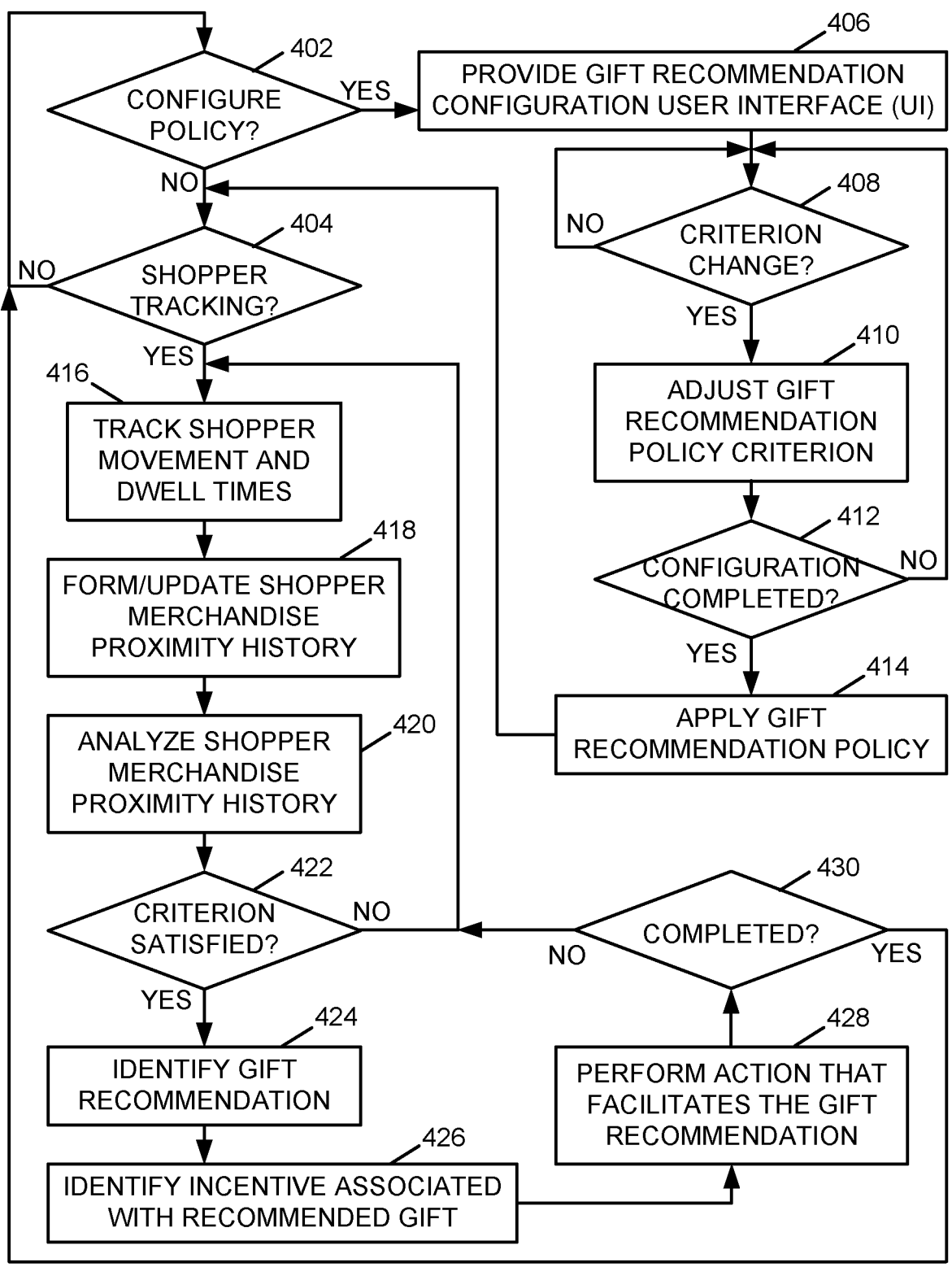
FIG. 7 is a flow chart of an example of an implementation of a process for in-store shopper location-based gift idea determination that further allows a shopper and/or retail environment personnel to create/adjust a gift recommendation policy according to an embodiment of the present subject matter.

FIG. 6 through FIG. 7 described below represent example processes that may be executed by devices, such as the core processing module 200, to perform the automated in-store shopper location-based gift idea determination associated with the present subject matter. Many other variations on the example processes are possible and all are considered within the scope of the present subject matter. The example processes may be performed by modules, such as the shopper tracking and gift idea determination module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 300 for in-store shopper location-based gift idea determination. The process 300 represents a computer-implemented method of performing the subject matter described herein. At block 302, the process 300 tracks a mobile device of a shopper within at least one retail environment. At block 304, the process 300 forms, from the tracking of the mobile device of the shopper within the at least one retail environment, a shopper merchandise proximity history of the shopper comprising shopper proximity to items of merchandise, shopper dwell times near the items of merchandise, and merchandise visit counts. At block 306, the process 300 analyzes the shopper merchandise proximity history according to at least one shopper merchandise threshold interest criterion. At block 308, the process 300 performs, responsive to identifying within the shopper merchandise proximity history an item of merchandise that meets the at least one shopper merchandise threshold interest criterion, an action that facilitates a gift recommendation of the item of merchandise.

FIG. 7 is a flow chart of an example of an implementation of a process 400 for in-store shopper location-based gift idea determination that further allows a shopper and/or retail environment personnel to create/adjust a gift recommendation policy. The process 400 represents a computer-implemented method of performing the subject matter described herein. At decision point 402, the process 400 begins higher-level iterative processing by determining whether a request to configure a gift recommendation policy has been detected from a user/shopper. It should be noted that configuration of the gift recommendation policy may provide a shopper with a way to guide the technology described herein. However, a retail environment may establish guidelines/criteria for generation of gift recommendations independently of the shopper. As such, the processing for configuration of a gift recommendation policy may be utilized as appropriate for a given implementation to provide flexibility for both retail environments and for shoppers. Further, the request to configure the gift recommendation policy may include both creation and adjustment of shopper merchandise threshold criteria that may be used to identify gift recommendations for the shopper. As described above, the shopper merchandise threshold interest criteria may include a threshold dwell time, a threshold dwell time percentage, a threshold number of shopping returns to items of merchandise, a threshold number of paired-shopper returns to items of merchandise, a combined impression threshold that comprises in-store shopping combined with online searching, and a multi-shopping trip number of shopper returns threshold, or other forms of criteria that may be used to identify gift recommendations as appropriate for the given implementation. Processing responsive to an affirmative determination at decision point 402 will be described in more detail below.

As such, in response to determining at decision point 402 that a request to configure a gift recommendation policy has not been detected from a user/shopper, the process 400 makes a determination at decision point 404 as to whether to begin tracking the shopper as the shopper moves among and dwells within different areas of a retail environment (e.g., store, garden center, etc.). In response to determining at decision point 404 not to begin tracking the shopper as the shopper moves among and dwells within different areas of a retail environment, the process 400 returns to decision point 402 and iterates as described above. Processing responsive to an affirmative determination at decision point 404 will also be described in more detail below.

It should be noted that the process 400 may be re-entrant to allow dynamic real-time configuration and adjustment of shopper merchandise threshold interest criteria. Further, the process 400 may be utilized to track a shopper across multiple shopping trips within the same store or within different stores.

Returning to the description of decision point 402, in response to determining that a request to configure a gift recommendation policy has been detected from a user/shopper, the process 400 provides a gift recommendation configuration user interface (UI) to the shopper at block 406. The gift recommendation configuration UI allows the shopper to adjust aspects of a gift recommendation policy that specifies one or more shopper merchandise threshold interest criteria as described above.

At decision point 408, the process 400 makes a determination as to whether a shopper merchandise threshold interest criterion has been changed by the shopper within the gift recommendation configuration UI. The process 400 iterates until the shopper specifies and/or changes at least one shopper merchandise threshold interest criterion.

In response to determining at decision point 408 that at least one shopper merchandise threshold interest criterion has been changed by the shopper within the gift recommendation configuration UI, the process 400 adjusts the gift recommendation policy criterion (or criteria) at block 410. At decision point 412, the process 400 makes a determination as to whether processing to create and/or adjust shopper merchandise threshold interest criteria is completed (e.g., by a user selection to begin shopping using the updated shopper merchandise threshold interest criteria). In response to determining at decision point 412 that processing to create and/or adjust shopper merchandise threshold interest criteria is not completed, the process 400 returns to decision point 408 and iterates as described above. In response to determining at decision point 412 that processing to create and/or adjust shopper merchandise threshold interest criteria is completed, the process 400 automatically applies the gift recommendation policy to identify an item of merchandise to suggest as a gift recommendation and an action to perform in response to detecting the shopper adjustments to the aspects of the gift recommendation policy using the gift recommendation configuration UI at block 414. As described above, because the process 400 is considered re-entrant, shopper merchandise proximity history may already exist from one or more previous shopping trips. The shopper merchandise proximity history may be analyzed and used to identify shopper activities within the shopper merchandise proximity history of an item of merchandise exceeding one or more shopper merchandise threshold interest criteria in response to the user adjusting or creating the gift recommendation policy. The process 400 returns to decision point 404 and iterates as described above.

Returning to the description of decision point 404, in response to determining to begin tracking the shopper as the shopper moves among and dwells within different areas of a store, the process 400 tracks shopper movement and dwell times, as described in more detail above, at block 416. At block 418, the process 400 forms or updates, the shopper merchandise proximity history of the shopper based upon the tracking. The shopper merchandise proximity history may include information such as shopper proximity to items of merchandise, shopper dwell times near the items of merchandise, and merchandise visit counts. Other information may be captured within the shopper merchandise proximity history, such as repeated visits to the same merchandise in the same or within different stores, paired-shopper returns to items of merchandise, and other measurable shopping activities for which shopper merchandise threshold interest criteria may be configured. At block 420, the process 400 analyzes the shopper merchandise proximity history according to one or more shopper merchandise threshold interest criteria, such as within a gift recommendation policy, as described above.

At decision point 422, the process 400 makes a determination as to whether one or more shopper merchandise threshold interest criteria have been satisfied, such as by being met or exceeded. The particular configuration setting(s) of the respective threshold being met or exceeded may be selected by the shopper or store personnel. In response to determining that one or more shopper merchandise threshold interest criteria have not been satisfied, the process 400 returns to block 416 and continues tracking the shopper movement and dwell times, and iterates as described above. In response to determining that one or more shopper merchandise threshold interest criteria have been satisfied at decision point 422, the process 400 identifies at block 424 a gift recommendation of an item of merchandise for the shopper in accordance with the shopper merchandise proximity history of the item of merchandise meeting (or alternatively exceeding) the respective one or more shopper merchandise threshold interest criteria.

At block 426, the process 400 identifies an incentive (e.g., coupon, etc.) associated with the recommended gift. As such, the process 400 may provide an incentive to another user to purchase the item of merchandise as a gift to the shopper in association with the gift recommendation. The process 400 performs an action that facilitates the gift recommendation of the item of merchandise at block 428. Facilitating the gift recommendation may include publishing the gift recommendation, such as by sending a notification of the item of merchandise as a gift recommendation to another user (e.g., friend, family, co-worker, etc.) and/or adding the item of merchandise as a wish list item or gift guide item for the shopper. Facilitating the gift recommendation may also/alternatively include showing the shopper the gift recommendation to make the shopper aware of how often the shopper has expressed non-verbal interest in the item, and the shopper may be allowed to edit the gift recommendation prior to other publishing. It should further be noted that if another user or the shopper purchases the gift recommendation, other users to which the gift recommendation was published may be alerted of the purchase (e.g., by sending a notification of purchase, by removing the item from the shopper's wish list or gift guide, etc.).

In response to performing the action that facilitates the gift recommendation of the item of merchandise at block 428, the process 400 makes a determination as to whether processing is completed. In response to determining that processing is not completed, the process 400 returns to block 416 and iterates as described above. Alternatively, in response to determining that processing is completed, the process 400 returns to decision point 402 and iterates as described above.

As such, the process 400 allows shoppers to configure their own gift recommendation policy that includes one or more shopper merchandise threshold interest criteria, as described above. The process 400 also tracks the shopper during one or more shopping trips within one or more stores and forms a shopper merchandise proximity history that is processed using the configured shopper merchandise threshold interest criteria to identify user interest in items of merchandise that meet (or exceed) the respective shopper merchandise threshold interest criteria. The process 400 allows the shopper to edit identified items of merchandise within automatically identified gift recommendations, and publishes gift recommendations via a variety of technological processes (e.g., notices, updating wish lists or gift guides, etc.). The process 400 further manages automated removal of published gift recommendations in response to purchase of the respective item(s) of merchandise by either the shopper or someone to which the gift recommendation was published. It should be noted that as described above the process 400 is considered re-entrant and may be utilized across multiple shopping trips and multiple physical stores. The tracking of the mobile device of the shopper may be performed across multiple stores, and the forming and analyzing of the shopper proximity history may be provided as part of a service in a cloud environment, as also described above.

As described above in association with FIG. 1 through FIG. 7, the example systems and processes provide in-store shopper location-based gift idea determination. Many other variations and additional activities associated with in-store shopper location-based gift idea determination are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, executed by at least one processor of a gift inference server(s) set, the method comprising:

tracking, to identify a shopper merchandise proximity history of a shopper within at least one retail environment, triangulated movement and non-movement of a mobile device of the shopper among different locations within the at least one retail environment using a coordinated combination of mobile device global positioning system (GPS) information with detected triangulated proximity of the mobile device relative to a plurality of different retail environment low-energy communication devices;

forming, from the tracking of the triangulated movement and non-movement of the mobile device of the shopper among the different locations within the at least one retail environment, a shopper merchandise proximity history of the shopper comprising shopper proximity to items of merchandise, shopper dwell times near the items of merchandise, and merchandise visit counts;

determining that an item of merchandise included in the shopper merchandise proximity history meets at least one shopper merchandise threshold; and providing, responsive to identifying within the shopper merchandise proximity history the item of merchandise that meets the at least one shopper merchandise threshold interest criterion, an electronic message that comprises a gift recommendation of the item of merchandise to at least one other user associated with and located remotely from the shopper.

2. The computer-implemented method of claim 1, where the at least one processor of the gift inference server(s) set providing the electronic message that comprises the gift recommendation of the item of merchandise to the at least one other user associated with and located remotely from the shopper comprises the at least one processor of the gift inference server(s) set one of sending a push notification of the item of merchandise as the gift recommendation to the at least one other user associated with and located remotely from the shopper or adding the item of merchandise as a wish list item for the shopper.

3. The computer-implemented method of claim 1, where the at least one shopper merchandise threshold interest criterion is selected from a group consisting of a threshold dwell time, a threshold dwell time percentage, a threshold number of shopping returns to items of merchandise, a threshold number of paired-shopper returns to items of merchandise, a combined impression threshold that comprises in-store shopping combined with online searching, and a multi-shopping trip number of shopper returns threshold.

4. The computer-implemented method of claim 1, further comprising the at least one processor of the gift inference server(s) set:

providing a gift recommendation configuration user interface (UI) that allows one of the shopper and a retailer to adjust aspects of a gift recommendation policy that specifies the at least one shopper merchandise threshold interest criterion; and automatically applying the gift recommendation policy to identify the item of merchandise in response to detecting one of a shopper adjustment and a retailer adjustment to an aspect of the gift recommendation policy using the gift recommendation configuration UI.

5. The computer-implemented method of claim 1, further comprising the at least one processor of the gift inference server(s) set one of:

providing, in association with the electronic message that comprises the gift recommendation, an incentive to the at least one other user associated with and located remotely from the shopper to purchase the item of merchandise as a gift to the shopper; or providing an additional electronic message to the shopper that identifies the item of merchandise.

6. The computer-implemented method of claim 1, where the at least one processor of the gift inference server(s) set identifies within the shopper merchandise proximity history the item of merchandise that meets the at least one shopper merchandise threshold interest criterion as part of a service in a cloud environment.

7. A system, comprising:
a memory; and
at least one processor of a gift inference server(s) set programmed to:
track, to identify a shopper merchandise proximity history of a shopper within at least one retail environment, triangulated movement and non-movement of a mobile device of the shopper among different locations within the at least one retail environment using a coordinated combination of mobile device global positioning system (GPS) information with detected triangulated proximity of the mobile device relative to a plurality of different retail environment low-energy communication devices;
provide, responsive to identifying within the shopper merchandise proximity history an item of merchandise that meets at least one shopper merchandise threshold interest criterion, an electronic message that comprises a gift recommendation of the item of merchandise to at least one other user associated with and located remotely from the shopper;
provide a gift recommendation configuration user interface (UI) that allows one of the shopper and a retailer to adjust aspects of a gift recommendation policy that specifies the at least one shopper merchandise threshold interest criterion; and
automatically apply the gift recommendation policy to identify the item of merchandise in response to detecting one of a shopper adjustment and a retailer adjustment to an aspect of the gift recommendation policy using the gift recommendation configuration UI.

8. The system of claim 7, where, in being programmed to provide the electronic message that comprises the gift recommendation of the item of merchandise to the at least one other user associated with and located remotely from the shopper, the at least one processor of the gift inference server(s) set is programmed to one of send a push notification of the item of merchandise as the gift recommendation to the at least one other user associated with and located remotely from the shopper or add the item of merchandise as a wish list item for the shopper.

9. The system of claim 7, where the at least one shopper merchandise threshold interest criterion is selected from a group consisting of a threshold dwell time, a threshold dwell time percentage, a threshold number of shopping returns to items of merchandise, a threshold number of paired-shopper returns to items of merchandise, a combined impression threshold that comprises in-store shopping combined with online searching, and a multi-shopping trip number of shopper returns threshold.

10. The system of claim 7, where the at least one processor of the gift inference server(s) set is further programmed to one of:
provide, in association with the electronic message that comprises the gift recommendation, an incentive to the at least one other user associated with and located remotely from the shopper to purchase the item of merchandise as a gift to the shopper; or
provide an additional electronic message to the shopper that identifies the item of merchandise.

11. The system of claim 7, where the at least one processor of the gift inference server(s) set identifies within the shopper merchandise proximity history the item of merchandise that meets the at least one shopper merchandise threshold interest criterion as part of a service in a cloud environment.

* * * * *